(12) United States Patent
Ding et al.

(10) Patent No.: US 9,076,436 B2
(45) Date of Patent: Jul. 7, 2015

(54) APPARATUS AND METHOD FOR APPLYING PITCH FEATURES IN AUTOMATIC SPEECH RECOGNITION

(71) Applicant: KABUSHIKI KAISHA TOSHIBA, Minato-ku, Tokyo (JP)

(72) Inventors: Pei Ding, Beijing (CN); Liqiang He, Beijing (CN)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 13/852,300

(22) Filed: Mar. 28, 2013

(65) Prior Publication Data

US 2013/0262099 A1    Oct. 3, 2013

(30) Foreign Application Priority Data

Mar. 30, 2012  (CN) .......................... 2012 1 0090660

(51) Int. Cl.
*G10L 15/02*    (2006.01)
*G10L 25/93*    (2013.01)

(52) U.S. Cl.
CPC  *G10L 15/02* (2013.01); *G10L 25/93* (2013.01)

(58) Field of Classification Search
None
See application file for complete search history.

(56) References Cited

U.S. PATENT DOCUMENTS 6,725,190 B1 * 4/2004  Chazan et al. ................. 704/205
6,829,578 B1 * 12/2004 Huang et al. ................... 704/211
7,181,391 B1 * 2/2007  Jia et al. ......................... 704/231
2003/0088402 A1 * 5/2003 Hoory et al. ................... 704/207
2003/0216912 A1   11/2003 Chino
2005/0086055 A1    4/2005 Sakai et al.
2009/0048835 A1 * 2/2009 Masuko ......................... 704/236
2009/0076814 A1    3/2009 Lee
2009/0210224 A1 * 8/2009 Fukuda et al. ................. 704/233

(Continued)

FOREIGN PATENT DOCUMENTS

CN    1343350 A    4/2002
CN    1453766 A    11/2003

(Continued)

OTHER PUBLICATIONS

Webpage  http://www.statlect.com/normal_distribuition_linear_combinations.hlm, Nov. 2, 2011.*

(Continued)

*Primary Examiner* — Jialong He
*Assistant Examiner* — Yi-Sheng Wang
(74) *Attorney, Agent, or Firm* — Ohlandt, Greeley, Ruggiero & Perle, L.L.P.

(57) ABSTRACT

According to one embodiment, an apparatus for applying pitch features in automatic speech recognition is provided. The apparatus includes a distribution evaluation module, normalization module, and random value adjusting module. The distribution evaluation module evaluates the global distribution of pitch features of voiced frames in speech signals, and the global distribution of random values for unvoiced frames in speech signals. The normalization module normalizes the global distribution of random values for unvoiced frames based on the global distribution of pitch features of voiced frames. The random value adjusting module adjusts random values for unvoiced frames based on the normalized global distribution, so that the adjusted random values can be assigned to unvoiced frames in speech signals as pitch features of the unvoiced frames.

10 Claims, 7 Drawing Sheets

(56) References Cited

U.S. PATENT DOCUMENTS

2010/0235169 A1    9/2010    Harma
2011/0066426 A1*    3/2011    Lee ............................ 704/207

FOREIGN PATENT DOCUMENTS

CN          1619643 A    5/2005
CN       101460994 A    6/2009

OTHER PUBLICATIONS

Webpage http://www.statlect.com/normal_distribution_linear_combinations.htm, Nov. 2, 2011.*
Kida, et al.; "Robust F0 Estimation Based on Log-Time Scale Autocorrelation and Its Application to Mandarin Tone Recognition"; in proceedings of INTERSPEECH, 2009, pp. 2791-2794.
Chinese First Office Action dated Mar. 3, 2015 from corresponding Chinese Patent Application No. 201210090660.4, 8 pages.

* cited by examiner

APPARATUS AND METHOD FOR APPLYING PITCH FEATURES IN AUTOMATIC SPEECH RECOGNITION

CROSS-REFERENCE TO RELATED APPLICATIONS

This application is based upon and claims the benefit of priority from Chinese Patent Application No. 201210090660.4, filed Mar. 30, 2012, the entire contents of which are incorporated herein by reference.

FIELD

Embodiments described herein relate generally to automatic speech recognition (ASR).

BACKGROUND

Languages such as Mandarin are tonal languages, in which the pronunciation of syllables generally has a number of (e.g., five) tones. The tones indicate the variation of voice pitch, which sometimes is very important discriminative information. However, in common ASR systems, the acoustic features usually ignore the tone and the pitch information is discarded, which is particularly a loss for speech recognition systems for tonal languages, especially small vocabulary recognition task, e.g. Chinese digit string recognition. Besides, such ASR systems cannot distinguish between word pairs that only differ in tones, i.e. homophonic words.

To improve the performance of ASR systems for tonal languages such as Mandarin, pitch features are extracted and combined with conventional acoustic features, e.g. MFCC, etc. There is a special problem in pitch extraction for ASR purpose, i.e. how to assign feature values in those unvoiced frames, e.g. consonants, in which there is no pitch information at all, in order to output a continuous feature stream. In general methods, random values are assigned in unvoiced frames as pitch features thereof. However, directly using random values will cause abnormal likelihood in decoding and consequently decrease the recognition performance.

Besides, in the extraction of pitch features, some intermedial parameters are also useful to improve the recognition performance, but are ignored in real applications.

DETAILED DESCRIPTION

Figure 1:
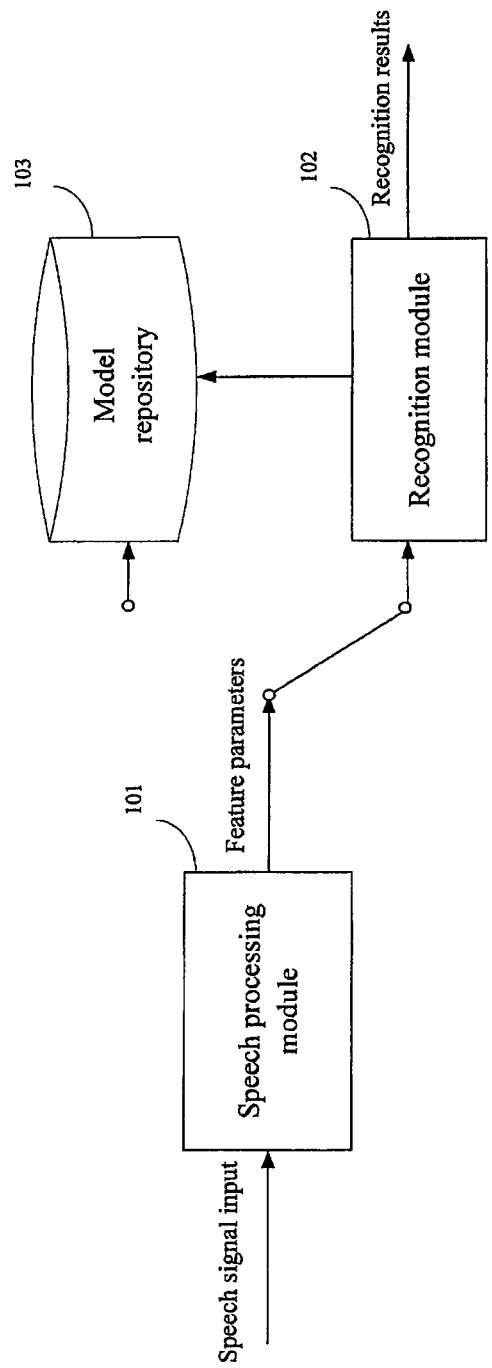
FIG. 1 is a block diagram of an exemplary speech recognition system in which the apparatus and method of the present embodiment may be implemented.

In one aspect, there is provided an apparatus for applying pitch features in automatic speech recognition, comprising: a distribution evaluation module configured to evaluate the global distribution of pitch features of voiced frames in speech signals, and the global distribution of random values for unvoiced frames in speech signals; a normalization module configured to normalize the global distribution of random values for unvoiced frames based on the global distribution of pitch features of voiced frames; and a random value adjusting module configured to adjust random values for unvoiced frames based on the normalized global distribution, so that the adjusted random values are assigned to unvoiced frames in speech signals as pitch features of the unvoiced frames.

In general, according to one embodiment, the normalizing the global distribution of random values for unvoiced frames based on the global distribution of pitch features of voiced frames comprises: making the standard deviation of the global distribution of random values for unvoiced frames close to the standard deviation of the global distribution of pitch features of voiced frames; and making the mean of the global distribution of random values for unvoiced frames deviate from the mean of the global distribution of pitch features of voiced frames.

According a further embodiment, the making the mean of the global distribution of random values for unvoiced frames deviate from the mean of the global distribution of pitch features of voiced frames comprises: making the difference between the mean of the global distribution of random values for unvoiced frames and the mean of the global distribution of pitch features of voiced frames close to 1.6 times the standard deviation of the global distribution of pitch features of voiced frames.

According to a further embodiment, the adjusting random values for unvoiced frames based on the normalized global distribution comprises: linearly transforming random values for unvoiced frames, to make the global distribution of the linearly transformed random values be the normalized global distribution.

According to an embodiment, the apparatus further comprises: a frame differentiation module configured to differentiate between voiced frames and unvoiced frames in speech signals; and a pitch feature extraction module configured to extract pitch features of voiced frames.

According to an embodiment, the apparatus further comprises: a feature combination module configured to combine non-pitch features and the pitch features of voiced frames and unvoiced frames, to be used in automatic speech recognition.

According to a further embodiment, the feature combination module is further configured to: combine non-pitch features, the pitch features, and voice-level parameters of voiced frames and unvoiced frames, to be used in automatic speech recognition.

According to an embodiment, the voice-level parameters reflect the strength of periodicity in speech signals.

In another aspect, there is provided a method for applying pitch features in automatic speech recognition, comprising the steps of: evaluating the global distribution of pitch features of voiced frames in speech signals, and the global distribution of random values for unvoiced frames in speech signals; normalizing the global distribution of random values for unvoiced frames based on the global distribution of pitch features of voiced frames; and adjusting random values for unvoiced frames based on the normalized global distribution, so that the adjusted random values are assigned to unvoiced frames in speech signals as pitch features of the unvoiced frames.

According to an embodiment, the normalizing the global distribution of random values for unvoiced frames based on the global distribution of pitch features of voiced frames comprises: making the standard deviation of the global distribution of random values for unvoiced frames close to the standard deviation of the global distribution of pitch features of voiced frames; and making the mean of the global distribution of random values for unvoiced frames deviate from the mean of the global distribution of pitch features of voiced frames.

According a further embodiment, the making the mean of the global distribution of random values for unvoiced frames deviate from the mean of the global distribution of pitch features of voiced frames comprises: making the difference between the mean of the global distribution of random values for unvoiced frames and the mean of the global distribution of pitch features of voiced frames close to 1.6 times the standard deviation of the global distribution of pitch features of voiced frames.

According to a further embodiment, the adjusting random values for unvoiced frames based on the normalized global distribution comprises: linearly transforming random values for unvoiced frames, to make the global distribution of the linearly transformed random values be the normalized global distribution.

According to an embodiment, the method further comprises the steps of differentiating between voiced frames and unvoiced frames in speech signals; and extracting pitch features of voiced frames.

According to an embodiment, the method further comprises the step of combining non-pitch features and the pitch features of voiced frames and unvoiced frames, to be used in automatic speech recognition.

According to a further embodiment, the combining step further comprises: combining non-pitch features, the pitch features, and voice-level parameters of voiced frames and unvoiced frames, to be used in automatic speech recognition.

According to an embodiment, the voice-level parameters reflect the strength of periodicity in speech signals.

Embodiments described herein may have at least one of the following advantages:

The normalization of random values for unvoiced frames avoids the abnormal likelihood caused by unrestricted random values, and increases the statistic discrimination between voiced and unvoiced frames, thus increasing the recognition accuracy;

It is easy to realize due to the estimation of the global distributions of pitch features of voiced frames and random values for unvoiced frames, and the normalization through linear transformation;

The assignment of normalized random values in unvoiced frames match the framework of continuous ASR;

The expansion of acoustic features by the voice-level parameters further increases the speech recognition accuracy;

The voice-level parameters are intermedial output in pitch feature extraction, so the feature expansion does not increase computation cost in the front-end of speech recognition.

Embodiments will be described below with reference to the drawings. In the following description, numerous details are set forth. However, it is apparent to those skilled in the art that realization of the present embodiment may not have some of the specific details. In addition, it is to be understood that the present embodiment is not limited to the described specific embodiments. On the contrary, it is contemplated that the present embodiment may be realized by any combination of the features and elements below, no matter whether they involve different embodiments or not. Therefore, the aspects, features, embodiments and advantages below are only illustrative, and shall not be construed as elements or limitations of the attached claims, unless otherwise stated explicitly in the claims.

FIG. 1 is a block diagram of an exemplary speech recognition system in which the apparatus and method of the present embodiment may be implemented. As shown, the speech recognition system may largely be divided into two parts: a speech processing module 101 and a recognition module 102; and may be divided into two operation phases: a training phase and a recognition phase. The speech processing module 101 is configured to process an input speech signal to obtain a feature parameter combination characterizing each acoustic unit (e.g. word, syllable, or phoneme), and store the model of the respective acoustic unit obtained by training the feature parameter combination in a model repository 103 in association with the acoustic unit (training phase), or provide the feature parameter combination to the recognition module 102, so that the recognition module 102 may recognize the respective acoustic unit by matching the feature parameter combination with models in the model repository 103 (recognition phase). In processing an input signal, the speech processing module 101 may first divide the input speech signal into sections of the same time length (e.g., 10-25 ms), called frames, and then perform a series of mathematical transformation on each frame to obtain a set of feature parameters of each frame, and take the combination of a number of feature parameters of a number of frames included in each acoustic unit as the feature parameters characterizing the acoustic unit.

It is to be noted that the speech recognition system as shown in FIG. 1 is only a simple schematic and exemplary illustration, rather than limitation to speech recognition systems in which the present embodiment may be implemented. The apparatus and method of the present embodiment may be applicable in any speech recognition system, and especially applicable in speech recognition systems for tonal languages, such as a speech recognition system for Mandarin.

The apparatus for applying pitch features in automatic speech recognition of the present embodiment may reside inside or outside the speech processing module 101, or partially inside the speech processing module 101 and partially outside the speech processing module 101.

Figure 2:
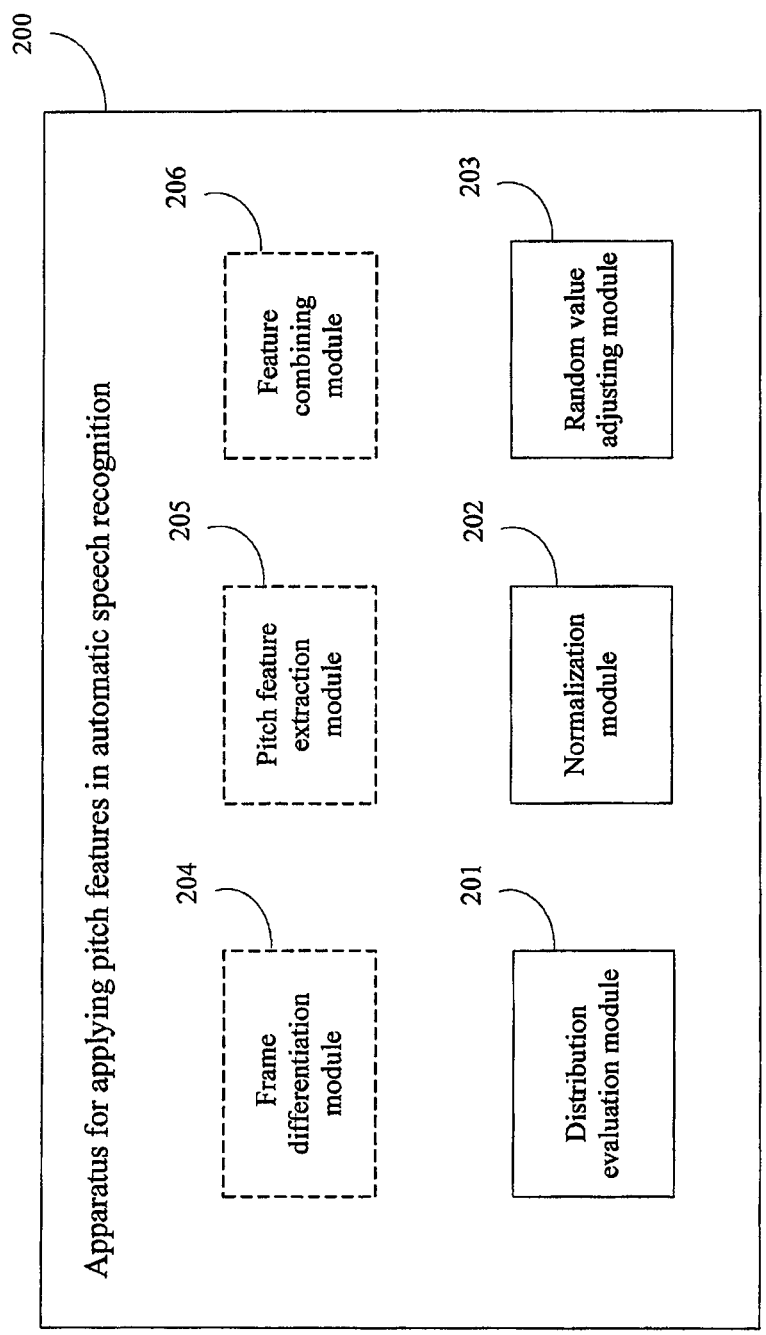
FIG. 2 illustrates an apparatus for applying pitch features in automatic speech recognition according to an embodiment.

FIG. 2 illustrates an apparatus 200 for applying pitch features in automatic speech recognition according to an embodiment. As shown, the apparatus 200 comprises: a distribution evaluation module 201, a normalization module 202 and a random value adjusting module 203.

The distribution evaluation module 201 is configured to evaluate the global distribution of pitch features of voiced frames in speech signals, and the global distribution of random values for unvoiced frames in speech signals.

According to some embodiments, the apparatus 200 further comprises: an optional frame differentiation module 204 configured to differentiate between voiced frames and unvoiced frames in speech signals; and an optional pitch feature extraction module 205 configured to extract pitch features of voiced frames.

According to some other embodiments, the apparatus 200 does not comprise the frame differentiation module 204 and the pitch feature extraction module 205; instead, the frame differentiation module 204 and the pitch feature extraction module 205 reside within the speech recognition system, but outside the apparatus 200.

A voiced frame refers to a frame in which a vowel in a speech resides, and an unvoiced frame refers to a frame in which a consonant or stop in a speech resides, after the speech signal is divided into frames. The frame differentiation module 204 may use any method known or to be developed to differentiate between voiced frames and unvoiced frames.

Pitch features may include a fundamental frequency, the first order difference of the fundamental frequency, the second order difference of the fundamental frequency, etc. A voiced frame has pitch features, while an unvoiced frame has no pitch features. The pitch feature extraction module 205 may use any method known or to be developed to extract pitch features of voiced frames. For unvoiced frames, the speech processing module 101 in the speech recognition system will usually generate random values as pitch features of the unvoiced frames, in order to form a continuous pitch feature stream of the speech signal to facilitate subsequent speech recognition processing.

The frame differentiation module 204 and pitch feature extraction module 205 may also use a method of differentiating between voiced frames and unvoiced frames and obtaining fundamental frequencies of voiced frames by calculating the periodicity strength of the speech signals as disclosed in Y. Kida, M. Sakai, T. Masuko and A. Kawamura, "Robust F0 estimation based on log-time scale autocorrelation and its application to Mandarin tone recognition" in proceedings of INTERSPEECH2009, pp. 2791-2794, which is incorporated herein in its entirety by reference.

The frame differentiation module 204 and pitch feature extraction module 205 runs both in the training phase and the recognition phase. In the training phase, the pitch feature extraction module 205 may store the extracted pitch features of each voiced frame and other acoustic features as generated by the voice processing module 101 in the model repository 103 (the random values and other acoustic features of unvoiced frames are also stored in the model repository). In the recognition phase, the pitch feature extraction module 205 may extract the pitch features of voiced frames in the speech signal to be recognized, which are combined with other acoustic features of the voiced frames as generated by the speech processing module 101 (the random values and other acoustic features of unvoiced frames are also combined), and then are mapped with acoustic features in the model repository 103 to recognize frames and acoustic units in the speech signal to be recognized.

The distribution evaluation module 201 may obtain all or some of the pitch features of voiced frames stored in the model repository 103 and use them to calculate the global distribution of pitch features of voiced frames, or obtain the pitch features of voiced frames of a number of input speech signals from the pitch feature extraction module 205 and use them to calculate the global distribution of pitch features of voiced frames. The distribution evaluation module 201 may obtain a number of random values for unvoiced frames as generated by the speech processing module 101, and use them to calculate the global distribution of random values for unvoiced frames. The global distribution of pitch features and the global distribution of random values may be expressed in the probability density function (PDF) of pitch features and the probability density function (PDF) of random values respectively, both of which are assumed to conform to the Gaussian distribution.

Figure 3:
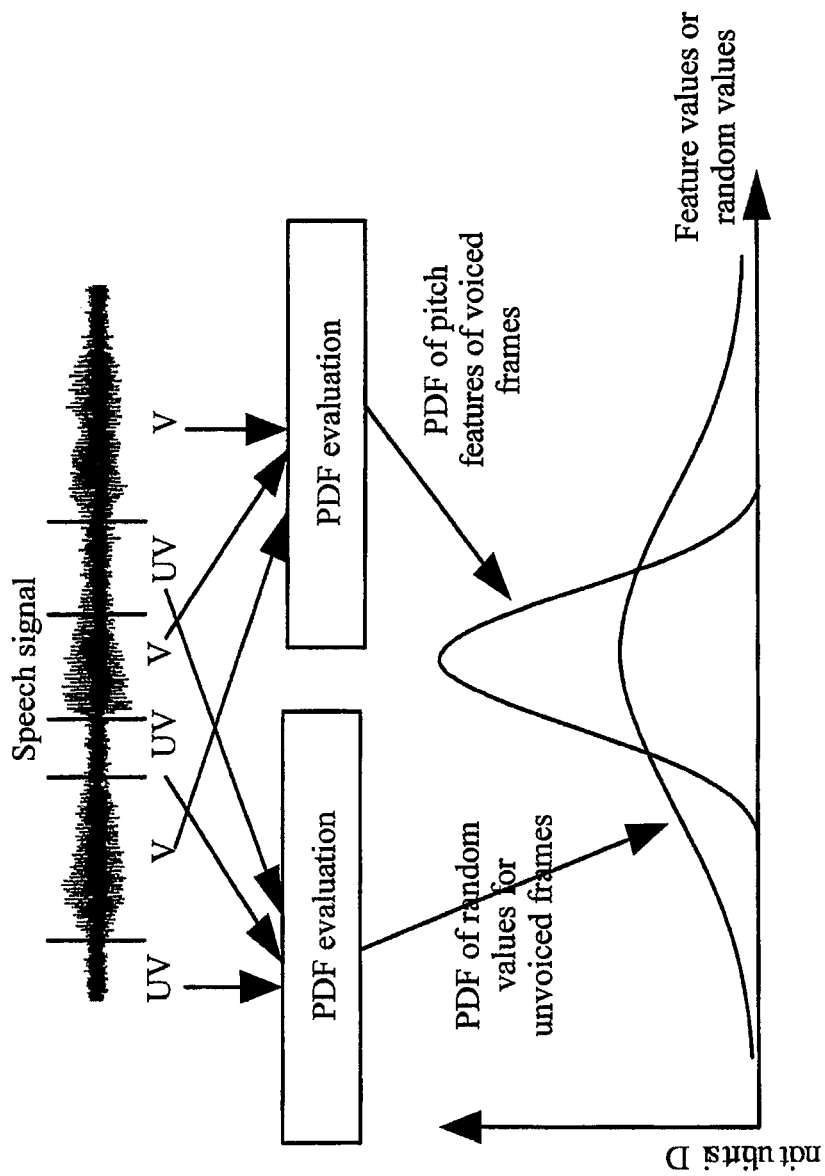
FIG. 3 is an exemplary schematic diagram of the global distribution of pitch features of voiced frames in speech signals and the global distribution of random values for unvoiced frames as estimated by the distribution estimation module.

FIG. 3 is an exemplary schematic diagram of the global distribution of pitch features of voiced frames in speech signals and the global distribution of random values for unvoiced frames as estimated by the distribution estimation module 201. In the figure, V denotes a voiced frame, UV denotes an unvoiced frame. The horizontal axis of the graph at the lower part of the figure denotes pitch feature values or random values, the vertical axis denotes the occurrence frequencies of pitch feature values or random values, and the two curved lines denote the probability density functions of pitch features of voiced frames and of random values for unvoiced frames. As shown, the probability density functions of pitch features of voiced frames and of random values for unvoiced frames have largely the same mean and different standard deviations.

Referring back to FIG. 2, the normalization module 202 is configured to normalize the global distribution of random values for unvoiced frames based on the global distribution of pitch features of voiced frames.

According to an embodiment, the normalizing the global distribution of random values for unvoiced frames based on the global distribution of pitch features of voiced frames comprises: making the standard deviation of the global distribution of random values for unvoiced frames close to the standard deviation of the global distribution of pitch features of voiced frames; and making the mean of the global distribution of random values for unvoiced frames deviate from the mean of the global distribution of pitch features of voiced frames.

According to an embodiment, the making the mean of the global distribution of random values for unvoiced frames deviate from the mean of the global distribution of pitch features of voiced frames comprises: making the difference between the mean of the global distribution of random values for unvoiced frames and the mean of the global distribution of pitch features of voiced frames close to 1.6 times the standard deviation of the global distribution of pitch features of voiced frames.

Figure 4A:
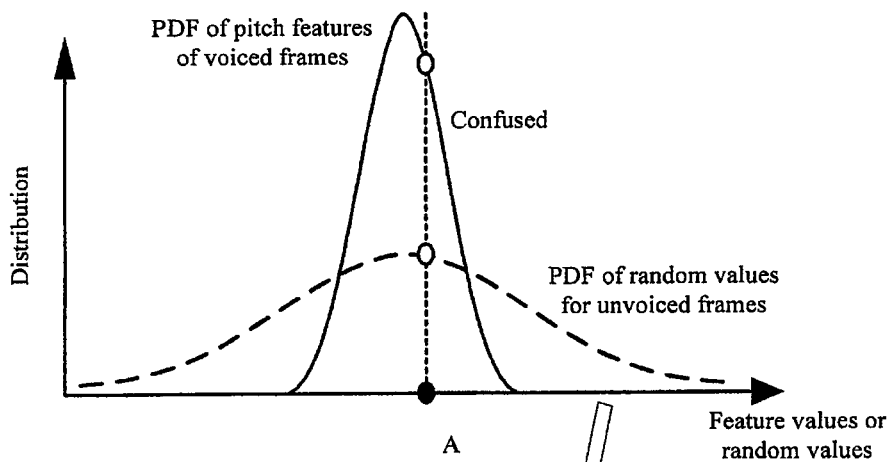
FIG. 4a is an exemplary schematic diagram of the global distribution of pitch features of voiced frames and the global distribution of random values for unvoiced frames before normalization.

FIG. 4a is an exemplary schematic diagram of the global distribution of pitch features of voiced frames and the global distribution of random values for unvoiced frames before normalization. As shown, the standard deviation of the global distribution of random values for unvoiced frames is greater than the standard deviation of the global distribution of pitch features of voiced frames, and the mean of the global distribution of random values for unvoiced frames is close to the mean of the global distribution of pitch features of voiced frames. Thus, a specific random value, e.g. A, for an unvoiced frame is easily confused with the feature value with the same value of a voiced frame, thus affecting the speech recognition effect.

Figure 4B:
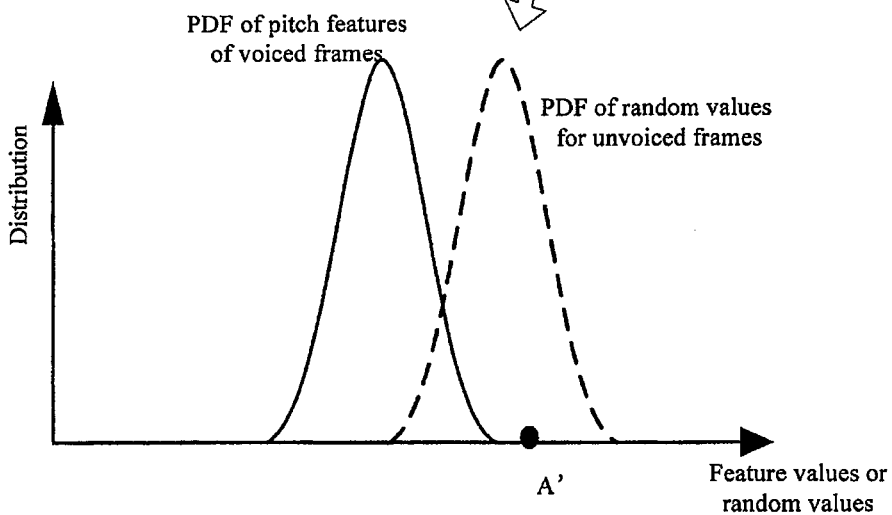
FIG. 4b is an exemplary schematic diagram of the global distribution of pitch features of voiced frames and the global distribution of random values for unvoiced frames after normalization.

FIG. 4b is an exemplary schematic diagram of the global distribution of pitch features of voiced frames and the global distribution of random values for unvoiced frames after normalization. As shown, after normalization, the standard deviation of the global distribution of random values for unvoiced frames is closer to the standard deviation of the global distribution of pitch features of voiced frames, and in a specific embodiment, the two are largely equal; in addition, the mean of the global distribution of random values for unvoiced frames deviates from the mean of the global distribution of pitch features of voiced frames appropriately, and in a specific embodiment, the distance between the two is about 1.6 times the standard deviation of the global distribution of pitch features of voiced frames, as expressed in the following formula:

$$\mathrm{Sigma}'(UV) = \mathrm{Sigma}(V),$$

$$\mathrm{Mean}'(UV) - \mathrm{Mean}(V) = 1.6 * \mathrm{Sigma}(V),$$

wherein, Sigma' (UV) denotes the standard deviation of the global distribution of random values for unvoiced frames after the normalization, Sigma(V) denotes the standard deviation of the global distribution of pitch features of voiced frames, Mean' (UV) denotes the mean of the global distribution of random values for unvoiced frames after the normalization, and Mean(V) denotes the mean of the global distribution of pitch features of voiced frames.

Referring back to FIG. 2, the random value adjusting module 203 is configured to adjust random values for unvoiced frames based on the normalized global distribution, so that the adjusted random values are assigned to unvoiced frames in speech signals as pitch features of the unvoiced frames.

According to an embodiment, the adjusting random values for unvoiced frames based on the normalized global distribution comprises: linearly transforming random values for unvoiced frames, to make the global distribution of the linearly transformed random values be the normalized global distribution.

As known to those skilled in the art, normalization of the distribution of random values can be realized by linear transformation of the random values. Thus, random values for unvoiced frames as generated by the speech processing module 101 may be linearly transformed, and the linearly-transformed random values may be substituted for the original random values, so as to make the global distribution of the linearly-transformed random values be the normalized global distribution described above, as shown in the following formula:

$$F'(UV)=a*F(UV)+b,$$

$$a=\text{Sigma}'(UV)/\text{Sigma}(UV),$$

$$b=\text{Mean}'(UV)-\text{Mean}(UV)*a,$$

wherein, F' (UV) is a linearly-transformed random value for an unvoiced frame, F(UV) is an original random value for an unvoiced frame as generated by the speech processing module 101, a and b are parameters of the linear transformation, Sigma' (UV) denotes the standard deviation of the global distribution of random values for unvoiced frames after the normalization, Sigma(UV) denote the standard deviation of the global distribution of random values for unvoiced frames before the normalization, Mean' (UV) denotes the mean of the global distribution of random values for unvoiced frames after the normalization, and Mean(UV) denotes the mean of the global distribution of random values for unvoiced frames before the normalization.

The random value adjusting module 203 may perform the linear transformation on each random value for an unvoiced frame as generated by the speech processing module 101 according to the above formula, and assign a linearly-transformed random value to each unvoiced frame, as a pitch feature of the unvoiced frame. For example, the specific random value A for an unvoiced frame in FIG. 4a, after the linear transformation, becomes the linearly-transformed random value A' for an unvoiced frame, thus no longer being easy to be confused with a specific feature value of a voiced frame, so that the speech recognition effect is enhanced.

Referring back to FIG. 2, according to an embodiment, the apparatus 200 further comprises: an optional feature combination module configured to combine non-pitch features and the pitch features of voiced frames and unvoiced frames, to be used in automatic speech recognition. The pitch features include pitch features of voiced frames as generated by the pitch feature extraction module 205, and random values, as adjusted by the random value adjusting module 203, for unvoiced frames as their pitch features.

According to a further embodiment, the feature combination module is further configured to: combine non-pitch features, the pitch features, and voice-level parameters of voiced frames and unvoiced frames, to be used in automatic speech recognition.

Figure 5:
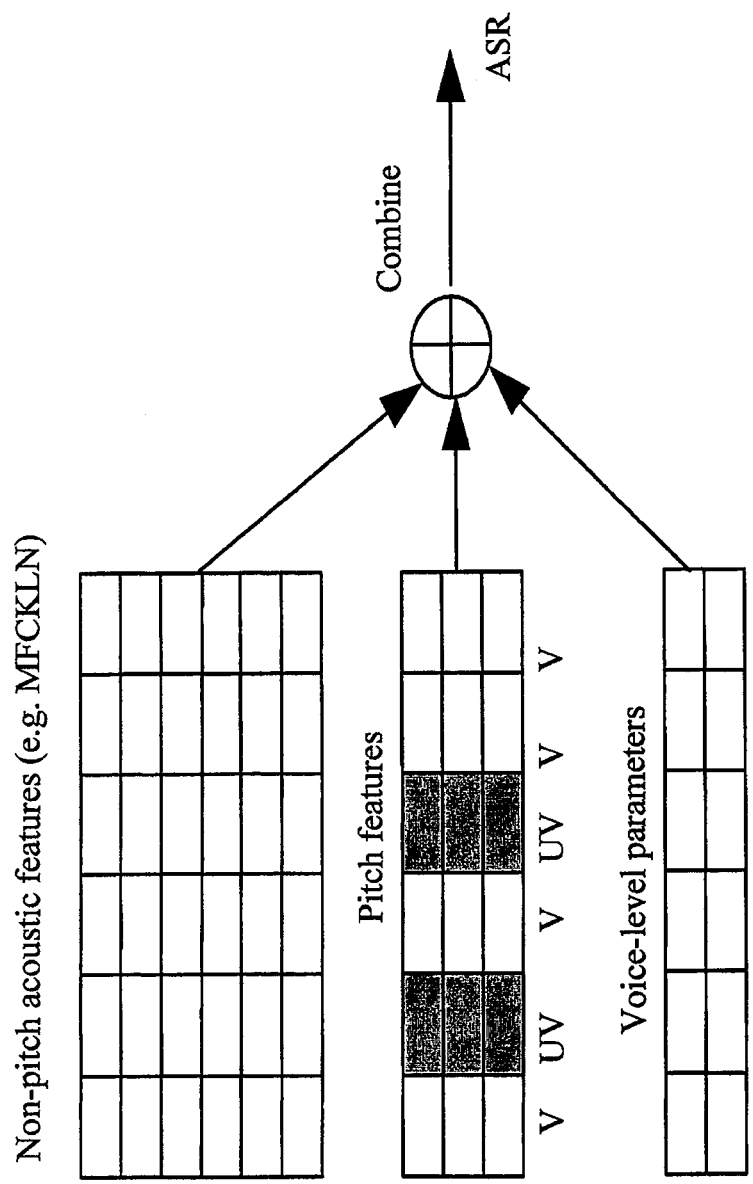
FIG. 5 is an exemplary schematic diagram of feature combination performed by the feature combination module.

FIG. 5 is an exemplary schematic diagram of feature combination performed by the feature combination module. In the figure, the table at the top left represents conventional non-pitch acoustic features, such as MFCC features etc., and each column of the table represents a set of non-pitch acoustic features of a voiced frame or an unvoiced frame. The table at the middle left represents pitch features of voiced frames, and random values as adjusted by the random value adjusting module 203 of unvoiced frames as their pitch features, and each column of the table represents a set of pitch features of a voiced frame, such as its fundamental frequency, the first order difference of the fundamental frequency and the second order difference of the fundamental frequency, etc., or a set of adjusted corresponding random values of an unvoiced frame. The table at bottom left represents voice-level parameters, and each column of the table represents a set of voice-level parameters of a voiced frame or an unvoiced frame. As shown, the conventional non-pitch acoustic features and pitch features and voice-level parameters are combined, to be used for subsequent speech recognition processing, such as being stored in the model repository 103 as models of frames and acoustic units in a training phase, or being matched with models in the model repository 103 to recognize frames and acoustic units in a input speech signal in a recognition phase.

Figure 6:
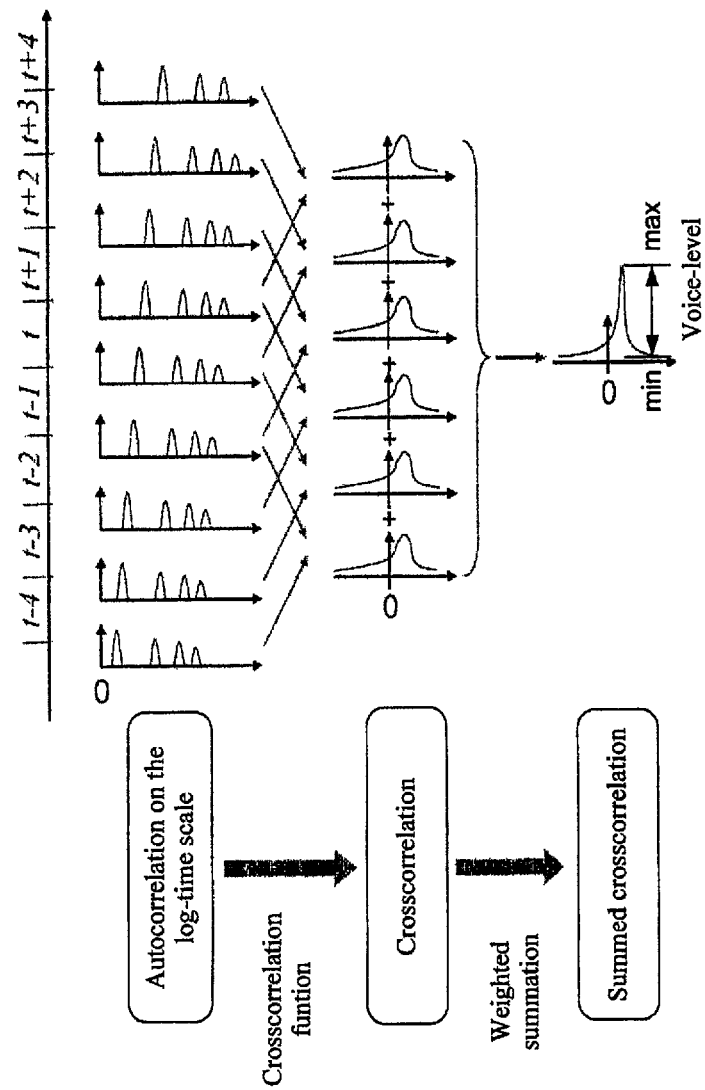
FIG. 6 schematically illustrates a method for calculating the voice-level parameters.

According to a further embodiment, the voice-level parameters reflect the strength of periodicity in speech signals. Specifically, the voice-level parameters may be intermedial results in differentiating between voiced frames and unvoiced frames and extracting pitch features (e.g., fundamental frequencies) of voiced frames. For example, in the above document of Y. Kida, M. Sakai, T. Masuko and A. Kawamura is described a method for calculating the voice-level parameters. FIG. 6 schematically illustrates the method for calculating the voice-level parameters. As shown, firstly cross-correlation functions between pairs of frames a certain distance apart, then the time series of adjacent cross-correlation functions are summed up to obtain a summed cross-correlation function, and the voice-level parameters are the difference value between the maximum and minimum values of the summed cross-correlation function. In addition, the voice-level parameters may further include the first order and/or higher order difference of this difference value.

It is to be noted that the random value adjusting module 203 and the feature combining module 206 may run both in the training phase and in the recognition phase. In the training phase, the random value adjusting module 203 may adjust random values for unvoiced frames based on the normalized global distribution, and assign the adjusted random values to unvoiced frames in training speech signals as pitch features of the unvoiced frames; the feature combining module 206 may combine non-pitch features and pitch features of voiced frames and unvoiced frames and possibly voice-level parameters in training speech signals, and store the combined features and parameters in the model repository 103 as models of respective frames and acoustic units. In the recognition phase, the random value adjusting module 203 may adjust random values for unvoiced frames based on the normalized global distribution, and assign the adjusted random values to unvoiced frames in a speech signal to be recognized as pitch features of the unvoiced frames; the feature combining module 206 may combine non-pitch features and pitch features of voiced frames and unvoiced frames and possibly voice-level parameters in the speech signal to be recognized, and match the combined features and parameters with models stored in the model repository 103, in order to recognize frames and acoustic units in the speech signal to be recognized.

While an apparatus 200 for applying pitch features in automatic speech recognition according to embodiments has been described above, it should be noted that the above description and illustration are only exemplary, rather than limitation to the present invention. In other embodiments, the apparatus 200 may have more, less or different modules, and the relationships of connection, containment, function, etc. among the modules may be different from described and illustrated.

Figure 7:
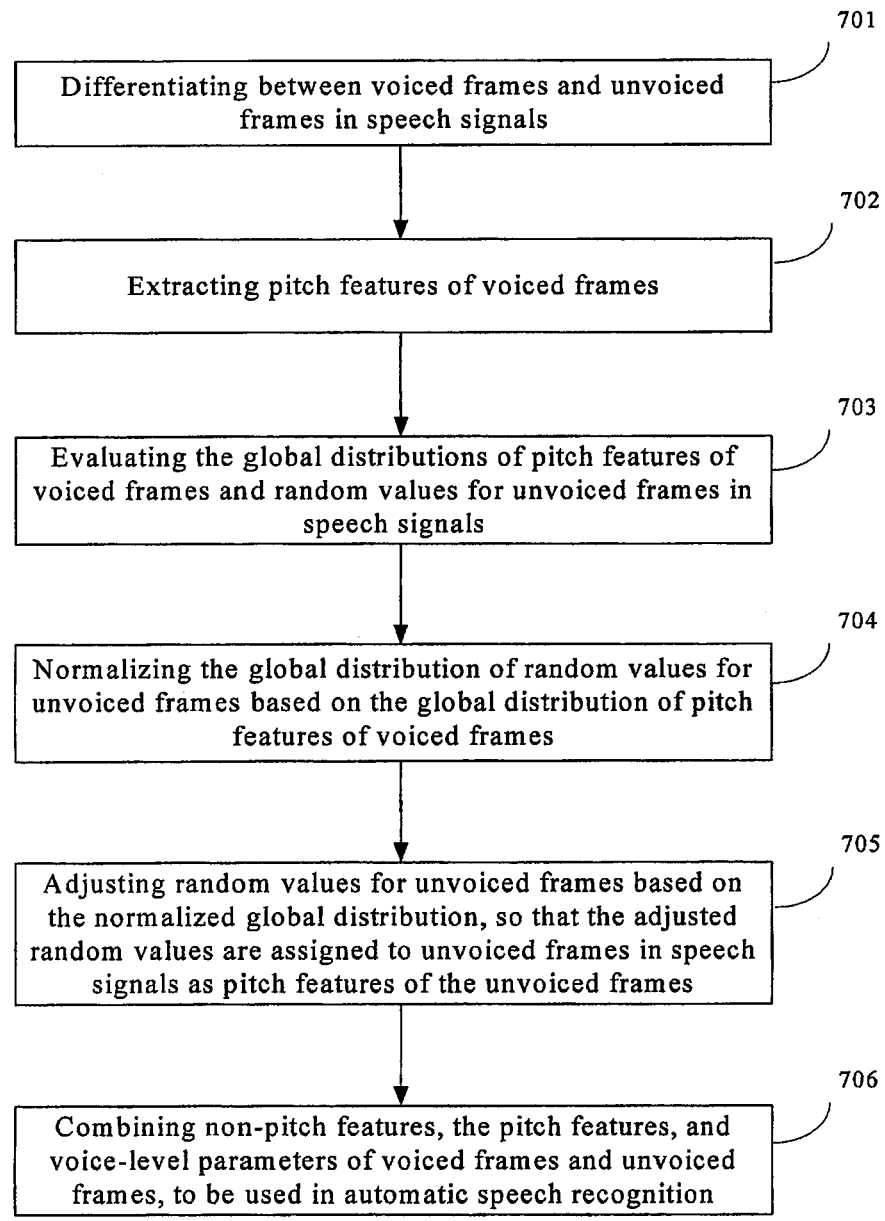
FIG. 7 illustrates a method for applying pitch features in automatic speech recognition according to an embodiment.

Now referring to FIG. 7, it schematically illustrates a method for calculating a voice-level parameter. As shown, the method comprises the following steps:

Step 703, evaluating the global distribution of pitch features of voiced frames in speech signals, and the global distribution of random values for unvoiced frames in speech signals.

Step 704, normalizing the global distribution of random values for unvoiced frames based on the global distribution of pitch features of voiced frames.

Step 705, adjusting random values for unvoiced frames based on the normalized global distribution, so that the adjusted random values are assigned to unvoiced frames in speech signals as pitch features of the unvoiced frames.

According to an embodiment, the normalizing the global distribution of random values for unvoiced frames based on the global distribution of pitch features of voiced frames comprises:

making the standard deviation of the global distribution of random values for unvoiced frames close to the standard deviation of the global distribution of pitch features of voiced frames; and making the mean of the global distribution of random values for unvoiced frames deviate from the mean of the global distribution of pitch features of voiced frames.

According a further embodiment, the making the mean of the global distribution of random values for unvoiced frames deviate from the mean of the global distribution of pitch features of voiced frames comprises:

making the difference between the mean of the global distribution of random values for unvoiced frames and the mean of the global distribution of pitch features of voiced frames close to 1.6 times the standard deviation of the global distribution of pitch features of voiced frames.

According to an embodiment, the adjusting random values for unvoiced frames based on the normalized global distribution comprises:

linearly transforming random values for unvoiced frames, to make the global distribution of the linearly transformed random values be the normalized global distribution.

According to an embodiment, the method further comprises the following optional steps:

Step 701, differentiating between voiced frames and unvoiced frames in speech signals; and Step 702 extracting pitch features of voiced frames.

According to an embodiment, the method further comprises the step 706 of combining non-pitch features and the pitch features of voiced frames and unvoiced frames, to be used in automatic speech recognition.

According to a further embodiment, the combining step 706 further comprises: combining non-pitch features, the pitch features, and voice-level parameters of voiced frames and unvoiced frames, to be used in automatic speech recognition.

According to an embodiment, the voice-level parameters reflect the strength of periodicity in speech signals.

While a method for applying pitch features in automatic speech recognition according to embodiments has been described, it should be noted that the above description and illustration are only exemplary, rather than limitation to the present invention. In other embodiments, the method may have more, less or different steps, and the relationships of sequence, containment, function, etc. among the steps may be different from described and illustrated. For example, in some embodiments, the method may also not include the above steps 701, 702, and 706.

The present embodiment can be realized in hardware, software, or a combination of hardware and software. The present embodiment can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present embodiment also can be embedded in a computer program product, which comprises all the features enabling the implementation of the methods described herein, and which when loaded in a computer system is able to carry out these methods.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for applying pitch features in automatic speech recognition, comprising:
   a computer processor associated with memory;
   a distribution evaluation module configured to evaluate a global distribution of pitch features of voiced frames in speech signals, and a global distribution of random values for unvoiced frames in speech signals;
   a normalization module configured to normalize the global distribution of the random values for unvoiced frames based on the global distribution of the pitch features of voiced frames, wherein the normalization module makes a standard deviation of the global distribution of the random values for unvoiced frames close to a standard deviation of the global distribution of the pitch features of voiced frames;
   a random value adjusting module configured to adjust the random values for unvoiced frames based on the normalized global distribution, so that the adjusted random values are assigned to unvoiced frames in speech signals as pitch features of the unvoiced frames; and a speech recognition module recognizing content of the speech signals based on the assigned pitch features of the unvoiced frames.

2. The apparatus of claim 1, wherein, the normalizing the global distribution of random values for unvoiced frames based on the global distribution of pitch features of voiced frames further comprises:
making the mean of the global distribution of random values for unvoiced frames deviate from the mean of the global distribution of pitch features of voiced frames.

3. The apparatus of claim 2, wherein, the making the mean of the global distribution of random values for unvoiced frames deviate from the mean of the global distribution of pitch features of voiced frames comprises:
making the difference between the mean of the global distribution of random values for unvoiced frames and the mean of the global distribution of pitch features of voiced frames close to 1.6 times the standard deviation of the global distribution of pitch features of voiced frames.

4. The apparatus of claim 1, wherein, the adjusting random values for unvoiced frames based on the normalized global distribution comprises:
linearly transforming random values for unvoiced frames, to make the global distribution of the linearly transformed random values be the normalized global distribution.

5. The apparatus of claim 1, further comprising:
a frame differentiation module configured to differentiate between voiced frames and unvoiced frames in speech signals; and
a pitch feature extraction module configured to extract pitch features of voiced frames.

6. The apparatus of claim 1, further comprising:
a feature combination module configured to combine non-pitch features and the pitch features of voiced frames and unvoiced frames, to be used in automatic speech recognition.

7. The apparatus of claim 6, wherein, the feature combination module is further configured to:
combine non-pitch features, the pitch features, and voice-level parameters of voiced frames and unvoiced frames, to be used in automatic speech recognition.

8. The apparatus of claim 7, wherein, the voice-level parameters reflect the strength of periodicity in speech signals.

9. A method for applying pitch features used in automatic speech recognition, comprising:
evaluating a global distribution of pitch features of voiced frames in speech signals, and a global distribution of random values for unvoiced frames in speech signals;
normalizing the global distribution of the random values for unvoiced frames based on the global distribution of the pitch features of voiced frames, wherein normalizing includes making a standard deviation of the global distribution of the random values for unvoiced frames close to a standard deviation of the global distribution of the pitch features of voiced frames;
adjusting the random values for unvoiced frames based on the normalized global distribution, so that the adjusted random values are assigned to unvoiced frames in speech signals as the pitch features of the unvoiced frames; and
deriving the pitch features of the unvoiced frames and incorporating same in the automatic speech recognition.

10. A computer program product comprising computer program storing device for storing executable instructions operable, when executed by a computer, causes the computer to perform:
evaluating a global distribution of pitch features of voiced frames in speech signals, and a global distribution of random values for unvoiced frames in speech signals;
normalizing the global distribution of the random values for unvoiced frames based on the global distribution of pitch features of voiced frames, wherein the normalizing includes making a standard deviation of the global distribution of the random values for unvoiced frames close to a standard deviation of the global distribution of the pitch features of voiced frames; and
adjusting the random values for unvoiced frames based on the normalized global distribution, so that the adjusted random values are assigned to unvoiced frames in speech signals as the pitch features of the unvoiced frames; and
recognizing content of the speech signals based on the assigned pitch features of the unvoiced frames.

* * * * *